United States Patent [19]
Widmann

[11] Patent Number: 5,602,542
[45] Date of Patent: Feb. 11, 1997

[54] PARKING AID WITH A WHEEL SENSOR

[75] Inventor: Friedrich Widmann, Berlin, Germany

[73] Assignee: Robert Bosch GmbH, Stuttgart, Germany

[21] Appl. No.: 446,593

[22] PCT Filed: Sep. 8, 1994

[86] PCT No.: PCT/DE94/01028

§ 371 Date: May 19, 1995

§ 102(e) Date: May 19, 1995

[87] PCT Pub. No.: WO95/09369

PCT Pub. Date: Apr. 6, 1995

[30]     Foreign Application Priority Data

Sep. 30, 1993 [DE] Germany .................. 43 33 357.5

[51] Int. Cl.⁶ .................................................... G08G 1/16
[52] U.S. Cl. .......................... 340/903; 340/435; 340/436; 340/904; 367/99; 367/909
[58] Field of Search ................ 340/932.2, 903, 340/995, 904, 435, 436, 437; 235/95 R, 97; 364/564, 565; 367/99, 909

[56]              References Cited

U.S. PATENT DOCUMENTS

| 4,537,271 | 8/1985 | Ito et al. ................................ 367/909 |
| 4,567,747 | 2/1986 | Matay ..................................... 73/598 |
| 4,694,296 | 9/1987 | Sasaki et al. ......................... 340/943 |
| 4,778,023 | 10/1988 | Sugasawa ............................. 180/140 |
| 4,908,704 | 3/1990 | Fujioka et al. ....................... 358/108 |
| 5,153,559 | 10/1992 | Atsumi .................................. 340/436 |
| 5,212,467 | 5/1993 | Park ...................................... 340/436 |
| 5,214,408 | 5/1993 | Asayama ............................... 340/436 |
| 5,220,536 | 6/1993 | Stringe et al. ........................ 364/565 |
| 5,330,226 | 7/1994 | Gentry et al. ......................... 340/540 |
| 5,386,285 | 1/1995 | Asayama ............................... 340/435 |

FOREIGN PATENT DOCUMENTS 2266397  10/1993  United Kingdom ............. G08G 1/16

*Primary Examiner*—Jeffery Hofsass
*Assistant Examiner*—Van T. Trieu
*Attorney, Agent, or Firm*—Michael J. Striker

[57]                ABSTRACT

A circuit arrangement determines a distance of a motor vehicle from an obstacle in a near range by a displacement sensor instead of an ultrasonic measurement. The distance is determined, above a predetermined limiting value, in accordance with the known ultrasonic transit time measurement. In this range, by comparing the signals of the displacement sensor with the ultrasonic measurement a calibration can be carried out and a correction factor for the displacement sensor can be formed. The correction factor is taken into account during the measurement in the near range, as is the contour of the vehicle.

15 Claims, 3 Drawing Sheets

PARKING AID WITH A WHEEL SENSOR

BACKGROUND OF THE INVENTION

The present invention relates to a circuit arrangement for a motor vehicle having an ultrasonic sensor and an evaluation circuit to determine the distance of a motor vehicle from an obstacle. A circuit arrangement for the determination and display of the undershooting of predetermined minimum distances between a vehicle and an obstacle is already known from EP 48 958 B1. In the circuit arrangement, used as a parking aid, an ultrasonic sensor transmits sound waves and measures the transit time of the echo reflected from an obstacle. In this arrangement, the measurement of the distance from the obstacle is sufficiently precise only during the approach to an obstacle as far as to a specific minimum value, since the sensor cannot register every contour in the case of a very small distance from obstacles, for example from the fender of the vehicle. This leads to the measurement being aborted or no longer displayed, on safety grounds, at a distance of a few centimeters. In practice, this leads to a relatively large amount of parking space being wasted during parking.

SUMMARY OF THE INVENTION

Accordingly, it is an object of the present invention to provide a parking aid with a wheel sensor, which avoids the disadvantages of the prior art.

In keeping with these objects and with others which will become apparent hereinafter, one feature of the present invention resides, briefly stated, in a circuit arrangement for a motor vehicle having an ultrasonic sensor, an evaluation circuit and a warning display for an output of a distance of a vehicle from an obstacle, wherein also at least one displacement sensor is provided and the evaluation circuit has means for determining a distance in an immediate near range of the motor vehicle from the signals of the displacement sensor, and the means is formed to determine the distance above a predetermined limiting value, by an ultrasonic transit time measurement.

When the device is designed in accordance with the present invention, it has the advantage that the distance from the vehicle contour can be registered with sufficient precision to a value close to 0 cm.

By means of the measures listed in the dependent claims, advantageous further developments and improvements of the circuit arrangement specified in the main is particularly advantageous that the measurement of the distance above a predetermined limiting value is carried out by means of ultrasonic measurement. This measurement is independent of steering movements and hence always registers the shortest distance from an obstacle. Below the predetermined limiting value, on the other hand, the distance determination is carried out using the measured values of the displacement sensor.

By comparing the measurement contour (=obstacle contour) with the stored vehicle contour, the shortest distance from an obstacle is advantageously registered. In consequence, obstacles located at the vehicle edge are also included in the evaluation. Furthermore, it is particularly advantageous that, as a result of the double measurement of the distance by means of the ultrasonic sensor and the comparison with a defined travel distance, which is measured by the displacement sensor, a calibration for the distance measurement can be carried out. By means of simple averaging, a correction factor can be formed which corrects the distance value for the corresponding measuring range. In this case, the correction can advantageously be carried out in such a way that a minimum distance is assessed, on safety grounds.

An advantageous application of the distance measurement is given in the case of a parking aid which can be used as a parking aid or an unparking aid.

Furthermore, it is advantageous to activate the display or the parking aid only at low speeds. At greater speeds, greater distances are also maintained, so that a measurement of short distances is no longer necessary. This threshold can be defined dynamically by means of the ABS sensors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
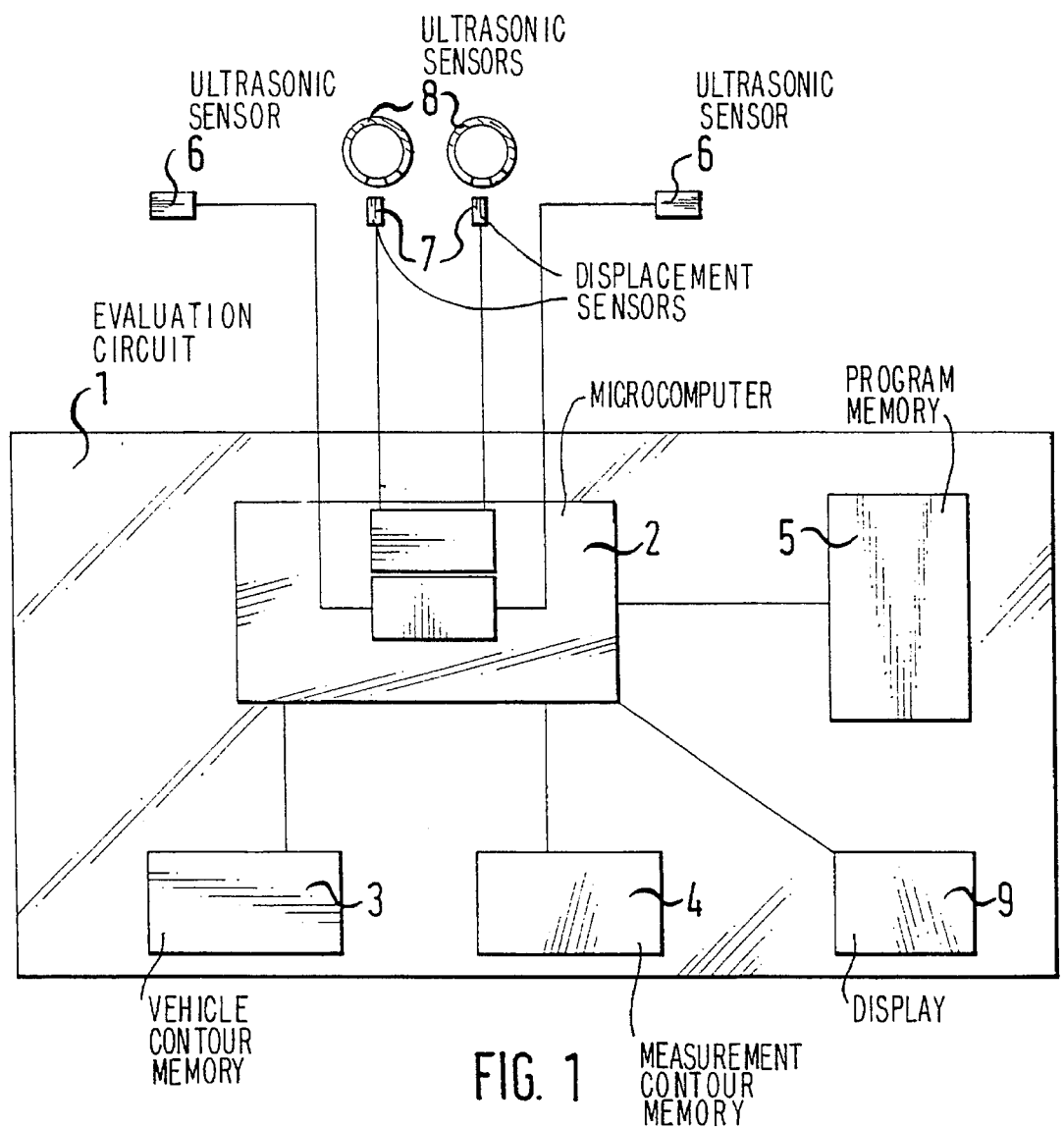
FIG. 1 shows a block diagram of the circuit arrangement.

The block diagram of FIG. 1 shows an evaluation circuit 1, which has a microcomputer 2 with a program memory 5. Contained in the program memory 5 is a control program which is used for measured value registration and evaluation. The evaluation circuit 1 furthermore has a vehicle contour memory 3 and a measurement contour memory 4, which are connected to the microcomputer 2. The microcomputer 2 is also connected to a display 9, on which the distance values are displayed. The microcomputer 2 is connected on the input side to one or more ultrasonic sensors 6. Furthermore, one or more displacement sensors 7 are connected to the microcomputer. The displacement sensors are expediently coupled to the wheels or to the gearbox of the vehicle. They emit digital or analog signals as a function of the travel distance covered by the vehicle. The displacement sensor 7 is connected, for example, to the wheel 8 of the rear axle of the vehicle. In the case of using analog displacement signals, corresponding analog/digital converters are to be provided for matching to the microcomputer 2. The driving of the ultrasonic sensor 6 is known per se, for example from EP 48 958 B1, and therefore does not need to be explained in more detail.

Figure 2:
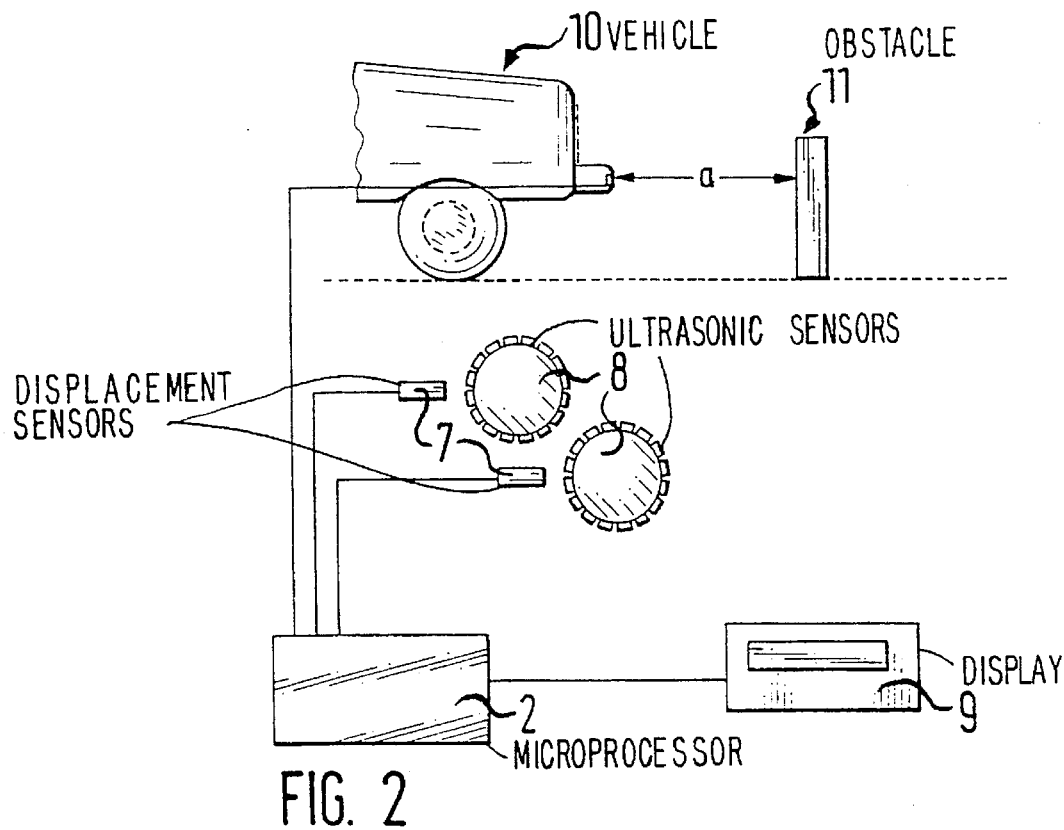
FIG. 2 shows an arrangement on a vehicle.

FIG. 2 shows a vehicle 10 which is at a distance a from an obstacle 11. This distance is measured by the microcomputer 2 via the wheel sensors 7 on the wheels in the near range. It is advantageous if this sensor is already provided for another subassembly such as ABS or for the tachometer, so that no additional displacement sensor needs to be used. The computer 2 is connected to a display 9, on which either optical range statements, warning advice or acoustic warning symbols are output.

Figure 4:
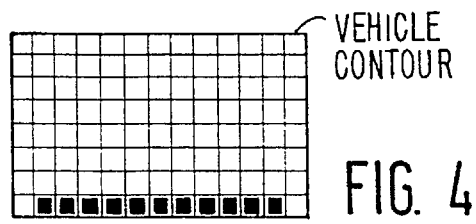
FIG. 4 shows a second diagram and FIG. 5 shows a flow diagram.
Figure 5:
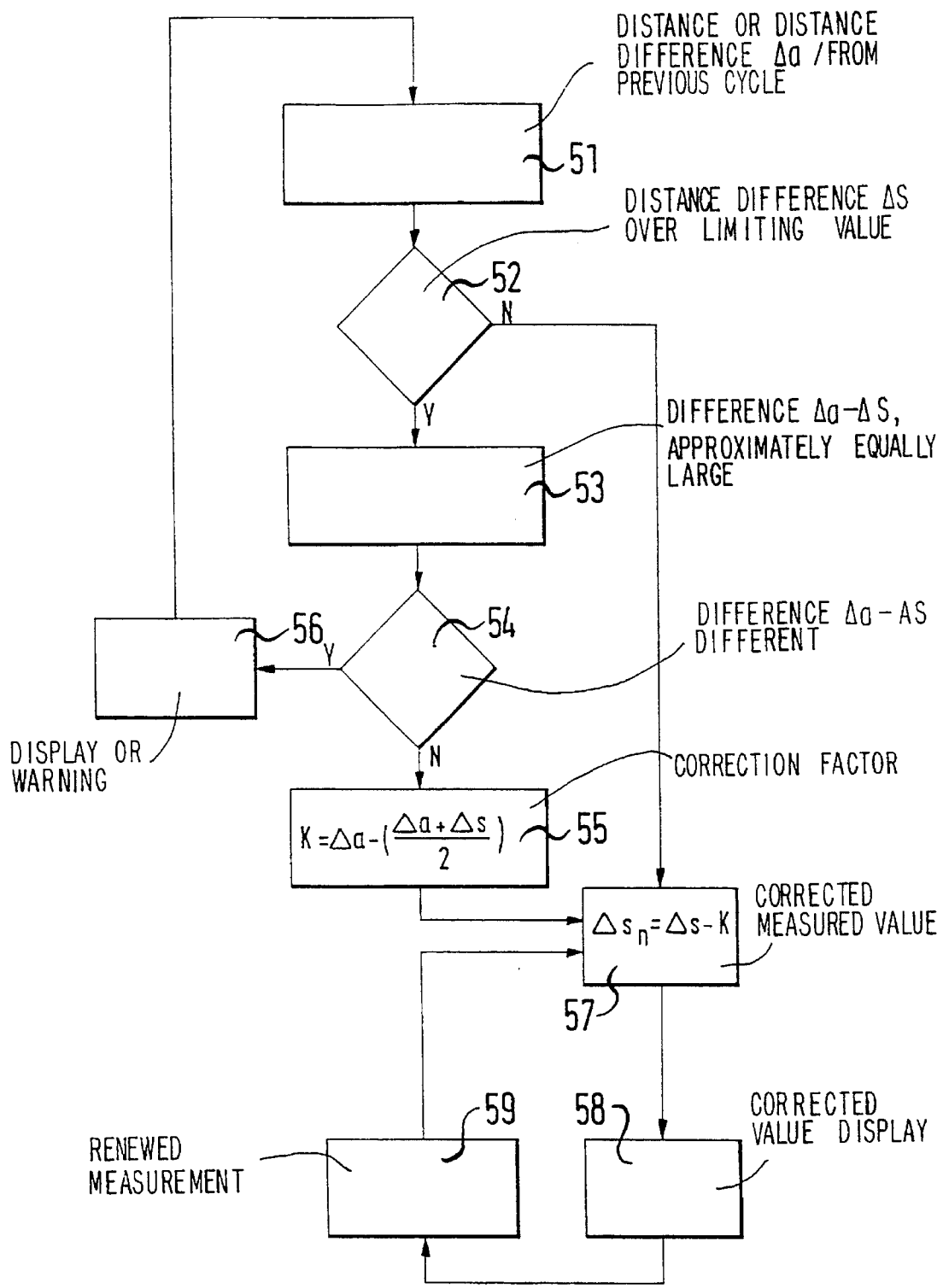

The functioning of the circuit arrangement will be explained in more detail using FIGS. 3 to 5. The flow diagram of FIG. 5 shows a sequence in principle of the distance determination. Initially, above a predetermined limiting value g, the distance measurement between the vehicle 10 and the obstacle 11 is carried out in accordance with the known ultrasonic measuring method. FIG. 5 shows, in position 51, the registration of the instantaneous distance a or, as appropriate, the difference Δa from the previous measuring cycle. In position 52 a check is now made whether the distance a is larger than or equal to the limiting value g. If the distance is larger, the distance or the difference from the previous measurement, s or Δs, is then determined. In position 54 the change Δa is compared with Δs. If these two values are approximately equally large, then it can be assumed that the distance determination is correct. This registered distance value is then acoustically or optically directly output via a display 56 or is output as a warning signal. The process subsequently begins again in position 51 with the next measurement.

However, if different distances are measured in position 54, a check must initially be made whether plausibility requirements are met. Specifically, it can occur that a pedestrian gets into the measuring field and the measurement result of the ultrasonic sensor then deviates very sharply from that of the displacement sensor. In this case, the ultrasonic sensor has the higher priority and assesses the distance from the pedestrian.

However, if both measured values lie within a tolerance range, a calibration for the distance measurement can then be carried out by determining a correction factor K. In position 55, therefore, the correction factor K is formed from the average of the two distances Δa and Δs and the average is subtracted from the distance Δa. This correction factor K is then later used for the correction of the displacement sensor.

If the obstacle is located in the near range of the vehicle, which has been established in position 52, a corrected measured value $\Delta s_n$ is formed in position 57 from the measurement result, the correction value K being subtracted from the current distance. The subtraction of the correction value from the current value Δs appears reasonable in order that the displayed measured value is smaller than or at most equally as large as the actual distance from the obstacle. By this means it is ensured that no collision can occur. The corrected value is displayed on the display position 58. Subsequently, in position 59, a renewed measurement is carried out, this is again corrected in position 57 and accordingly displayed in position 58. This can be repeated until the distance is 0.

Figure 3:
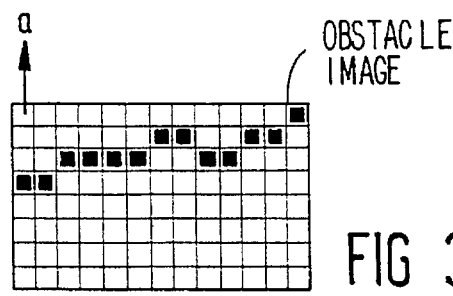
FIG. 3 shows a first diagram.

FIG. 3 shows a diagram in which an obstacle image over the distance a in the environment of the vehicle is stored in the travel direction. A plurality of obstacles having different distances can be seen. FIG. 4 shows an environment contour of the vehicle, which corresponds to the fender of the vehicle. This contour is stored in the memory 3 and is compared with the measured contour, which is stored in the memory 4. In this arrangement, the respectively shortest distance from the vehicle contour in the travel direction is preferably registered. The vehicle contour according to FIG. 4 is fixed and is entered once during the installation of the parking aid. The measurement contour changes continuously as a function of the obstacles registered. It is determined, for example, during the registration of the distances Δa in position 51. Since, during parking or unparking, driving speeds are only small, it is sufficient if the distance display or the distance measurement is activated only up to a specific vehicle speed. If, on the other hand, greater distances must also be measured at greater speeds, it is then recommended to select the measuring range for the display such that greater distances can also be displayed. For this case it is sufficient to activate the display beginning at a specific minimum speed value.

It will be understood that each of the elements described above, or two or more together, may also find a useful application in other types of constructions differing from the types described above.

While the invention has been illustrated and described as embodied in a parking aid with a wheel sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A circuit arrangement for a motor vehicle comprising an ultrasonic sensor; an evaluation circuit; a warning display for an output of a distance of a vehicle from an obstacle; at least one displacement sensor producing signals; said evaluation circuit having distance determining means for determining a distance between a motor vehicle and an obstacle and formed so that in an immediate near range of the motor vehicle from the obstacle said distance determining means determine the distance from the signals of said displacement sensor while above a predetermined limited value said determining means determine the distance by an ultrasonic transit time measurement.

2. A circuit arrangement as defined in claim 1, wherein said means for determining a distance is formed to determine the distance within a predetermined measuring limit by means of a model calculation with the aid of the signals of said displacement sensor and the ultrasonic transit time measurement.

3. A circuit arrangement as defined in claim 1, wherein said means for determining a distance include a microcomputer and a contour memory.

4. A circuit arrangement as defined in claim 3, wherein said contour memory is formed so that a vehicle contour is stored in said contour memory and a distance of an object located closest to the vehicle contour can be assessed.

5. A circuit arrangement as defined in claim 1, wherein said means for determining a distance include a microcomputer and a measured value memory.

6. A circuit arrangement as defined in claim 1, wherein said means for determining a distance is formed so that they compare distance values of said ultrasonic sensor with the signals of said displacement sensor above the limiting value and calibrate both by averaging, with a correction value being formed with which subsequent distance measurements are correctable.

7. A circuit arrangement as defined in claim 1, wherein said ultrasonic sensor is calibratable at a defined distance.

8. A circuit arrangement as defined in claim 7, wherein said ultrasonic sensor is calibrated at a distance of 0 cm.

9. A circuit arrangement as defined in claim 7, wherein said displacement sensor is calibrated at a distance of 0 cm.

10. A circuit arrangement as defined in claim 1, wherein said sensors, said evaluating circuit, said warning display and said means for determining distance being formed so as to provide a parking aid for the motor vehicle.

11. A circuit arrangement as defined in claim 1, wherein said sensors, said evaluating circuit, said warning display and said means for determining distance being formed so as to provide an unparking aid for the motor vehicle.

12. A circuit arrangement as defined in claim 1, wherein said evaluation circuit is switchable upon reaching a predetermined minimum speed.

13. A circuit arrangement as defined in claim 1, wherein said evaluation circuit is switchable upon reaching a predetermined maximum speed.

14. A circuit arrangement for a motor vehicle, comprising an ultrasonic sensor; an evaluation circuit; a warning display for an output of a distance of a vehicle from an obstacle; at least one displacement sensor producing signals, said evaluation circuit having means for determining a distance in an immediate near range of the motor vehicle from the signals of said displacement sensor, said means for determining a distance between a motor vehicle and the obstacle from the signals of said displacement sensor being formed to determine a distance above a predetermined limiting value by an ultrasonic transit time measurement, said sensors, said evaluating circuit, said warning display and said means for determining distance being formed so as to provide a parking aid for the motor vehicle.

15. A circuit arrangement for a motor vehicle, comprising an ultrasonic sensor; an evaluation circuit; a warning display for an output of a distance of a vehicle from an obstacle; at least one displacement sensor producing signals, said evaluation circuit having means for determining a distance in an immediate near range of the motor vehicle from the signals of said displacement sensor, said means for determining a distance between a motor vehicle and the obstacle from the signals of said displacement sensor being formed to determine a distance above a predetermined limiting value by an ultrasonic transit time measurement, said sensors, said evaluating circuit, said warning display and said means for determining distance being formed so as to provide an unparking aid for the motor vehicle.

* * * * *